(12) United States Patent
Greminger et al.

(10) Patent No.: US 8,837,090 B2
(45) Date of Patent: Sep. 16, 2014

(54) GIMBAL LIMITER FOR SUSPENSION WITH LIFT TAB

(71) Applicant: Seagate Technology LLC, Cupertino, CA (US)

(72) Inventors: Michael Allen Greminger, St. Anthony, MN (US); Razman Zambri, Eden Prairie, MN (US); Jackson William Brandts, Watertown, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/951,570

(22) Filed: Jul. 26, 2013

(65) Prior Publication Data

US 2013/0321957 A1    Dec. 5, 2013

Related U.S. Application Data

(62) Division of application No. 13/186,947, filed on Jul. 20, 2011.

(51) Int. Cl.
*G11B 5/48*        (2006.01)

(52) U.S. Cl.
CPC ............ *G11B 5/4833* (2013.01); *G11B 5/4826* (2013.01)
USPC .................................................... 360/245.7

(58) Field of Classification Search
CPC .. G11B 5/4826; G11B 5/4833; G11B 5/4853; G11B 5/54; G11B 5/486; G11B 5/6005; G11B 21/16; G11B 21/22
USPC ............ 360/245.7, 245, 245.3, 245.4, 245.5, 360/245.6
See application file for complete search history.

(56) References Cited

U.S. PATENT DOCUMENTS

| | | | | |
|---|---|---|---|---|
| 4,724,500 A * | 2/1988 | Dalziel | ...................... | 360/245.7 |
| 5,333,085 A | 7/1994 | Prentice et al. | | |
| 5,771,136 A | 6/1998 | Girard | | |
| 5,815,349 A * | 9/1998 | Frater | ......................... | 360/245.7 |
| 5,877,920 A * | 3/1999 | Resh | .......................... | 360/245.7 |
| 5,930,079 A | 7/1999 | Vera et al. | | |
| 6,069,773 A * | 5/2000 | Frater et al. | ................ | 360/245.7 |
| 6,088,201 A | 7/2000 | Kazama | | |
| 6,181,525 B1 | 1/2001 | Carlson | | |
| 6,191,915 B1 | 2/2001 | Takagi et al. | | |
| 6,233,121 B1 | 5/2001 | Pan | | |
| 6,243,235 B1 | 6/2001 | Fu et al. | | |
| 6,388,843 B1 | 5/2002 | Takagi et al. | | |
| 6,417,996 B1 | 7/2002 | Budde | | |
| 6,424,498 B1 * | 7/2002 | Patterson et al. | .......... | 360/245.7 |
| 6,445,546 B1 | 9/2002 | Coon | | |
| 6,538,850 B1 | 3/2003 | Hadian et al. | | |

(Continued)

*Primary Examiner* — Brian Miller
(74) *Attorney, Agent, or Firm* — Kagan Binder, PLLC (57) ABSTRACT

A head suspension for a disk drive with a load beam having continuous rails and a distal lift tab. A dimple is positioned proximal to the lift tab, either on the load beam or the gimbal, the dimple providing a pitch axis and a roll axis for the slider. The suspension also includes at least one tab member fixed in relation to the load beam, where each of the at least one tab member is aligned with or is distal to the dimple. The at least one tab and a portion of the gimbal define a gimbal limiter that is aligned with or distal to the dimple. The at least one tab member extends either longitudinally or laterally from the load beam at or distal to the dimple.

14 Claims, 7 Drawing Sheets

(56) References Cited

U.S. PATENT DOCUMENTS

| | | |
|---|---|---|
| 6,587,309 B2 | 7/2003 | Nojima |
| 6,587,311 B1 * | 7/2003 | Niijima et al. ............... 360/255 |
| 6,611,402 B1 | 8/2003 | Mangold |
| 6,747,849 B1 | 6/2004 | Le et al. |
| 6,801,400 B2 | 10/2004 | Fu et al. |
| 6,995,953 B2 | 2/2006 | Mahoney et al. |
| 7,010,847 B1 | 3/2006 | Hadian et al. |
| 7,085,104 B1 | 8/2006 | Hadian et al. |
| 7,130,157 B2 | 10/2006 | Sassine et al. |
| 7,236,330 B2 * | 6/2007 | Suk ........................... 360/245.7 |
| 7,330,338 B1 | 2/2008 | Wick et al. |
| 7,369,366 B2 | 5/2008 | Kim et al. |
| 7,489,478 B2 | 2/2009 | Agari et al. |
| 7,535,678 B2 | 5/2009 | Arya |
| 7,583,474 B2 | 9/2009 | Suzuki et al. |
| 7,602,585 B2 | 10/2009 | Choi |
| 7,719,797 B1 | 5/2010 | Mei |
| 7,839,604 B1 | 11/2010 | Coffey et al. |
| 8,107,198 B1 | 1/2012 | Ee |
| 8,116,039 B2 * | 2/2012 | Takikawa ................. 360/245.7 |
| 2002/0075602 A1 * | 6/2002 | Mangold et al. ........... 360/245.7 |
| 2005/0174696 A1 | 8/2005 | Choi et al. |
| 2007/0230058 A1 | 10/2007 | Muraki et al. |
| 2009/0009911 A1 | 1/2009 | Yang et al. |
| 2009/0154022 A1 * | 6/2009 | Takikawa ................. 360/245.7 |

* cited by examiner

GIMBAL LIMITER FOR SUSPENSION WITH LIFT TAB

This application is a divisional application of U.S. patent application Ser. No. 13/186,947, filed Jul. 20, 2011.

BACKGROUND OF THE INVENTION

Components of many electronic, electro-mechanical, and optical devices and systems need precise position and alignment to assure optimal performance. In the case of certain magnetic recording disk drives, for example, a read/write head needs to be carefully positioned with respect to a surface of a disk during use to assure optimum performance and to avoid crashing the head into the disk and causing damage.

Disk drives that utilize a head assembly for reading and/or writing data on a rotatable magnetic disk are well known in the art. In such drives, the head assembly is typically attached to an actuator arm by a head suspension assembly. The head suspension assembly, or suspension assembly, includes a head suspension and a slider onto which a read/write head is provided. The slider and head fly over the spinning disk at precisely determined heights, due to the lift force caused by an air bearing that spins with the disk.

Head suspensions generally include an elongated load beam with a gimbal flexure located at a distal end of the load beam. According to a typical head suspension construction, the gimbal flexure comprises a platform suspended by gimbal arms or struts. The slider, which includes the read/write head or transducer, is mounted to the underside of the platform. The slider is aerodynamically shaped to use the air bearing generated by the spinning disk to produce a lift force off from the disk. During operation of such a disk drive, the gimbal struts permit the slider to pitch and roll about two axes around a load dimple, thereby allowing the slider to precisely follow the disk surface.

The present disclosure provides improved suspensions for precisely supporting the slider during use while precluding excess slider movement during abnormal events, such as external shock.

SUMMARY

One particular embodiment of this disclosure is a head suspension for a disk drive with a load beam having a proximal end and a distal end and having a distal lift tab. The load beam supports a gimbal that has a slider fixed thereto. A dimple is positioned proximal to the lift tab, either on the load beam or the gimbal, the dimple providing a pitch axis and a roll axis for the slider. The load beam includes continuous rails extending along the load beam toward the distal end, the rails extending to at least the dimple. Also included is at least one tab member in fixed relation to the load beam, where each of the at least one tab member is aligned with or is distal to the dimple. The at least one tab and a portion of the gimbal define a gimbal limiter that is aligned with or distal to the dimple.

These and various other features and advantages will be apparent from a reading of the following detailed description.

BRIEF DESCRIPTION OF THE DRAWING

The invention may be more completely understood in consideration of the following detailed description of various embodiments of the invention in connection with the accompanying drawing, in which:

FIG. 1A is a top plan view, FIG. 1B is a side elevation view, and FIG. 1C is a cross-sectional view of a disk drive head suspension without a lift tab having a gimbal limiter.

FIG. 2A is a top plan view, FIG. 2B is a side elevation view.

FIG. 3A is a top plan view, FIG. 3B is a side elevation view.

FIG. 4A is a top plan view, FIG. 4B is a side elevation view.

FIG. 5A is a top plan view, FIG. 5B is a side elevation view.

FIG. 6A is a top plan view, FIG. 6B is a side elevation view.

FIG. 7A is a top plan view, FIG. 7B is a side elevation view.

DETAILED DESCRIPTION OF THE INVENTION

The present disclosure provides head suspensions for precisely supporting a slider on a load beam with a gimbal and a gimbal limiter. The designs are particularly suited for thin load beams (e.g., less than 0.05 mm in thickness) that have a lift tab at the distal end of the beam.

In the following description, reference is made to the accompanying drawing that forms a part hereof and in which are shown by way of illustration various specific embodiments. The description provides additional specific embodiments. It is to be understood that other embodiments are contemplated and may be made without departing from the scope or spirit of the present invention. The following Detailed Description, therefore, is not to be taken in a limiting sense. While the present invention is not so limited, an appreciation of various aspects of the invention will be gained through a discussion of the examples provided below.

Unless otherwise indicated, all numbers expressing feature sizes, amounts, and physical properties are to be understood as being modified by the term "about." Accordingly, unless indicated to the contrary, the numerical parameters set forth are approximations that can vary depending upon the desired properties sought to be obtained by those skilled in the art utilizing the teachings disclosed herein.

As used herein, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

Figure 1A:
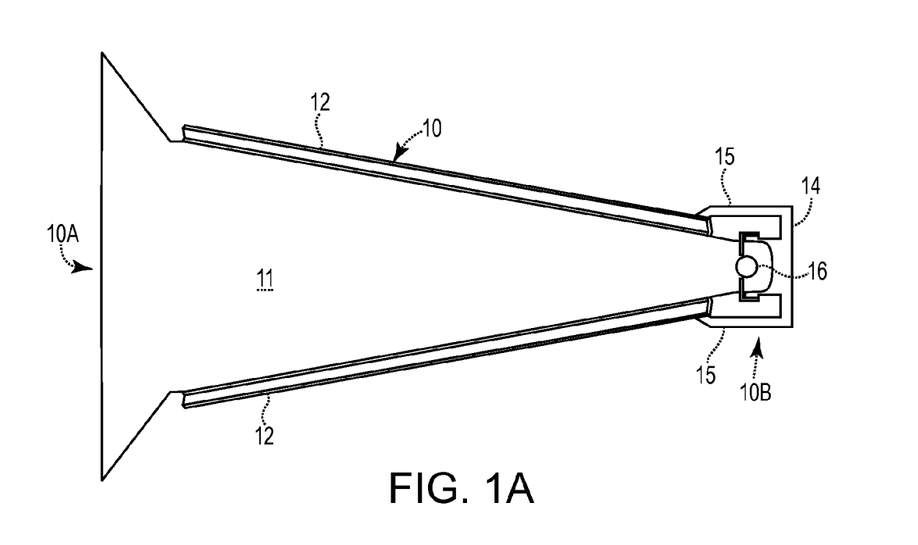
Figures 1B, 1C:
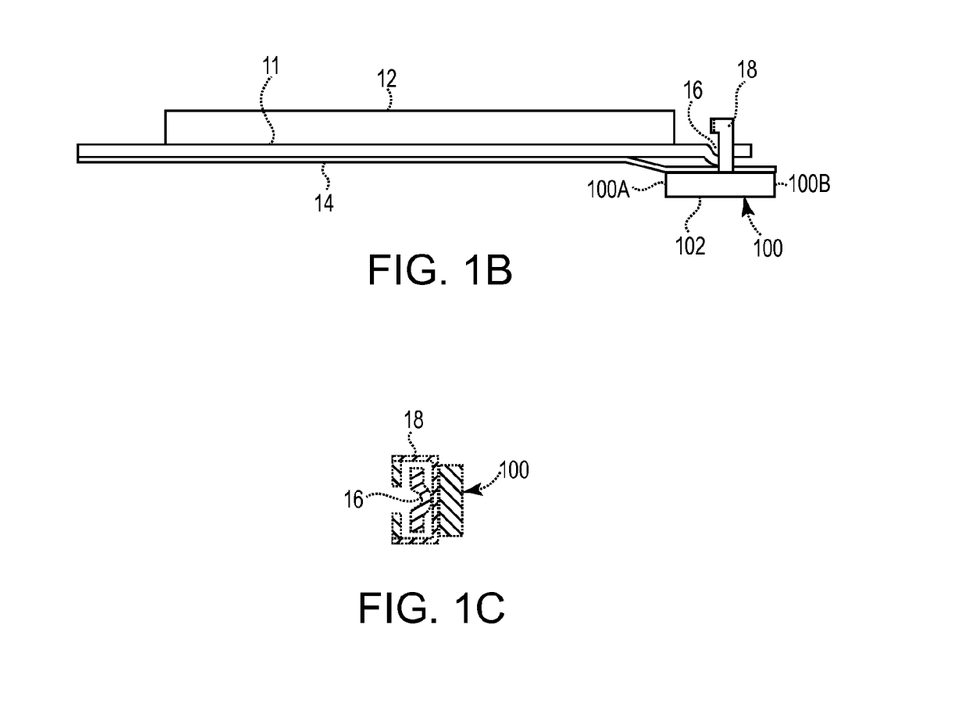
Figure 2A:
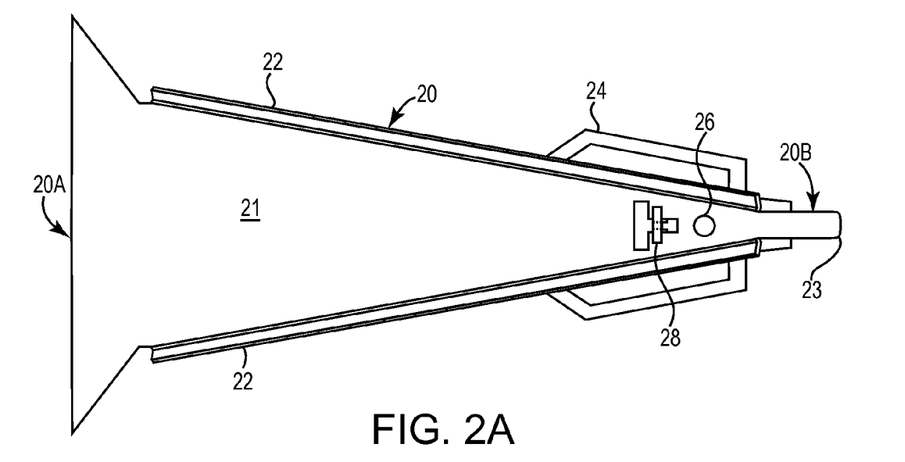
Figure 2B:
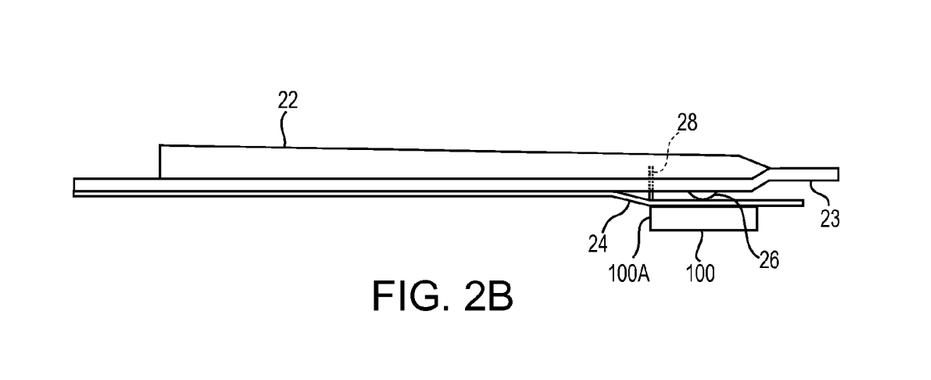
Figure 2C:
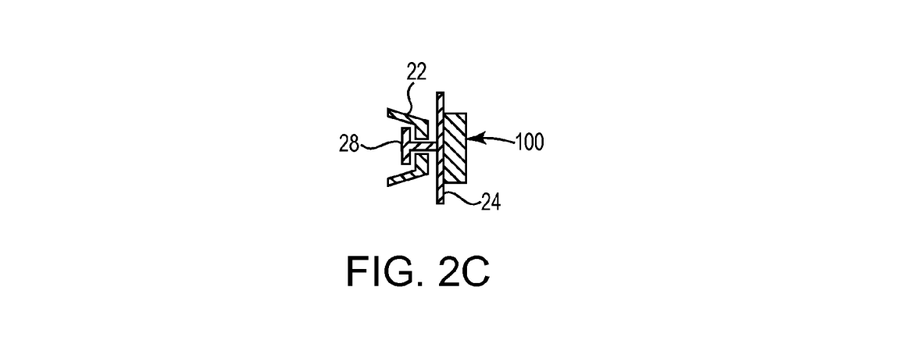
FIG. 2C is a cross-sectional view of a disk drive suspension design with a lift tab having a gimbal limiter positioned proximal to the dimple.

Returning to head suspensions, to prevent damage during handling and in-drive shock events, gimbal limiters are incorporated into gimbal designs to limit the extent of their motion. FIGS. 1A, 1B, and 1C illustrate a gimbal limiter design for a suspension without a lift tab, and FIGS. 2A, 2B and 2C illustrate a gimbal limiter design for a suspension with a lift tab.

Gimbal limiters are more effective if they can be positioned longitudinally along the load beam at the dimple location, or distal to the dimple location. A gimbal limiter is more effective when it is at or near the trailing edge side of the slider, rather than at the leading edge side of the slider. This positioning of the gimbal limiter is readily achievable for suspension designs without lift tabs as shown in FIGS. 1A, 1B and 1C.

FIGS. 1A, 1B and 1C illustrate a suspension design that has a load beam 10 with a proximal end 10A and a distal end 10B. Load beam 10 has an elongate central planar surface 11 bounded by rails 12 that extend from the proximal end 10A toward distal end 10B of load beam 10; rails 12 are illustrated as on the top surface of load beam 10, although in other embodiments rails 12 may be present on the bottom surface of load beam 10. Load beam 10 is generally formed from stainless steel. Rails 12 provide lateral and bending stiffening and increase torsion resistance to load beam 10; in some embodiments, rails 12 provide a mechanism for supporting electrical features (not shown). Rails 12 are typically present on 'thin' load beams 10 having a thickness of planar surface 11 that is less than 0.05 mm; load beams made from a thicker material may not include rails, as the material itself provides sufficient stiffness to beam 10. Rails 12 are often formed by folding or bending the material (e.g., stainless steel) that forms central planar surface 11.

Connected to load beam 10 is a gimbal flexure or spring 14, or merely gimbal 14, which flexibly supports a slider 100. Gimbal 14 is positioned on the bottom of load beam 10, between load beam 10 and the disk. Slider 100 has a leading edge 100A on the proximal side of slider 100 and a trailing edge 100B on the distal side of slider 100, and includes an upper surface facing gimbal 14 and load beam 10 and a lower air bearing surface (ABS) 102.

In the illustrated embodiment, gimbal 14 extends the length of load beam 10 from proximal end 10A to distal end 10B, although in other embodiments gimbal 14 may not extend back to proximal end 10A. At distal end 10B, gimbal 14 includes flexure arms or struts 15 supported by and extending both laterally and longitudinally in spaced cantilevered relation from load beam 10. Distal end 10B of load beam 10 is operably coupled to gimbal struts 15. Struts 15 are spaced relative to the width of slider 100 a certain distance from its centerline, and struts 15 are sized to provide desired roll characteristics. It is generally known that if gimbal struts 15 are spaced too far apart, roll stiffness increases and if spaced too close, roll stiffness is too low. If the width of gimbal struts 15 is too thick, roll and pitch stiffness increases and if too thin, the gimbal lacks sufficient mechanical robustness. The overall design of gimbal struts 15, and of gimbal 14 itself, can be adjusted from that disclosed herein and still remain within the scope of the invention described herein.

In this embodiment of the suspension, central surface 11 includes a load-bearing dimple 16 at distal end 10B extending toward slider 100. In alternate embodiments, dimple 16 may be present on gimbal 14. Dimple 16 applies a load force between load beam 10 and the upper surface of slider 100 and defines a laterally extending pivot axis about which slider 100 can pitch, and a longitudinally extending pivot axis about which slider 100 can roll, to follow the topography of the disk surface. Dimple 16 is generally at the center of slider 100, both laterally and longitudinally, for flight stability of slider 100 during operation.

During operation of the disk drive, it is important to maintain a stable fly height for slider 100 close to the disk surface and that slider 100 be able to pitch and roll to follow the topography of the disk surface. Thus, gimbal 14 is designed to support slider 100 relative to load beam 10 to allow sufficient pitch and roll of slider 100 about dimple 16 during operation. If the pitch and roll stiffness of gimbal 14 is too low, gimbal 14 will lack sufficient mechanical robustness, whereas if gimbal 14 is too stiff in the pitch and roll axes, then slider 100 will not be able to follow the topography of the disk surface.

During a shock event, such as during shipping or if the disk drive is dropped, slider 100 can pull gimbal 14 away from load beam 10 in the absence of some deflection limiting mechanism. The stress from the shock event could be high enough to distort gimbal 14 and result in changes to the pitch and roll static angle of gimbal 14. A deflection limiting mechanism prevents this from happening by ensuring that the deflection is not too large to cause the stress on gimbal 14 to reach the yield point.

The suspension of FIGS. 1A, 1B and 1C includes a limiter 18 that sets a maximum distance slider 100 can move away from dimple 16 and load beam 10. Best seen in FIGS. 1B and 1C, in this embodiment, limiter 18 includes two arms or tab members that extend from gimbal 14 at slider 100 and bend over load beam 10, thus limiting the distance of travel of slider 100 from dimple 16. Limiter 18 is essentially longitudinally aligned with dimple 16, or in other words, is essentially even with dimple 16.

This design of limiter 18 is easy to implement with gimbal 14 and load beam 10. However, for suspension designs with a lift tab (which is often included at distal end 10B of load beam 10 for reasons described below), the limiter and gimbal design of FIGS. 1A, 1B, and 1C is not suitable because the load beam rails extend all the way to the end of the load beam and often to the lift tab, thus interfering with the limiter. The rails do not provide sufficient clearance for the gimbal features to wrap around load beam 10 at dimple 16.

Unless indicated otherwise, the various features of subsequent embodiments described herein are consistent with and the same as the similar various features of the embodiment described above of FIGS. 1A, 1B and 1C.

FIGS. 2A, 2B and 2C illustrate a suspension design that has a load beam 20 with a proximal end 20A and a distal end 20B with a lift tab 23 at distal end 20B. Similar to the previous embodiment, load beam 20 has an elongate central planar surface 21 bounded by rails 22 that extend from the proximal end 20A to distal end 20B. The suspension of this embodiment includes lift tab 23, which is configured to engage a ramp (not shown) when the disk drive is in a non-operating state and during deceleration of the disk during power-down operations. In order to provide sufficient stiffness to load beam 20, rails 22 extend to lift tab 23.

Connected to load beam 20 is a gimbal 24, which flexibly supports slider 100. In the illustrated embodiment, gimbal 24 extends the length of load beam 20 from proximal end 20A to distal end 20B. Gimbal 24, in this embodiment, extends short of the end of lift tab 23.

A dimple 26 formed in load beam 20 applies a load force between load beam 20 and the upper surface of slider 100 and defines a laterally extending pivot axis about which slider 100 can pitch, and a longitudinally extending pivot axis about which slider 100 can roll. In alternate embodiments, dimple 26 may be present on gimbal 24. Dimple 26 is at the center portion of slider 100 for flight stability of slider 100. As seen in FIGS. 2A and 2B, rails 22 extend distal of dimple 26.

A limiter 28 sets a maximum distance slider 100 can move away from dimple 26 and load beam 20. In this embodiment, limiter 28 includes a single center tab member that extends from gimbal 24, through load beam 20 to engage load beam 20, thus limiting the distance of travel of slider 100 from dimple 26. The limiter 28 of FIGS. 2A, 2B and 2C, however, is not a preferred embodiment, because limiter 28 is positioned at leading edge 100A of slider 100, or on the proximal side of dimple 26.

The following embodiments describe various embodiments of load beams with a lift tab and stiffening rails having gimbal limiters that have the limiter located at the dimple or trailing edge side of the dimple. Again, unless indicated otherwise, the various features of the subsequent embodiments described herein are consistent with and the same as the similar various features of the embodiments described above. In each of the embodiments, the suspension includes at least one tab member fixed to the load beam, and a gimbal limiter defined by the at least one tab member and a portion of the gimbal. Either the tab member or the gimbal is bent or folded to connect the tab member to the gimbal and form the gimbal limiter. In at least some embodiments, the gimbal limiter is present outside of the footprint of the slider, i.e., either laterally spaced out from the slider or distal to the slider (at or distal to the trailing edge of the slider)).

FIGS. 3A, 3B, 3C, 3D and 4A, 4B, 4C, 4D illustrate embodiments where two tab members extend out laterally from the load beam and longitudinally aligned with the dimple. In one embodiment, a portion of the gimbal is folded to engage the tab members and in the other embodiment, a portion of the tab members is folded to engage the gimbal.

Referring to FIGS. 3A, 3B, 3C and 3D, the suspension design has a load beam 30 with a proximal end 30A and a distal end 30B with a lift tab 33 at distal end 30B. Load beam 30 has an elongate central planar surface 31 bounded by continuous rails 32 that extend from the proximal end 30A to distal end 30B and to lift tab 33 in order to provide sufficient stiffness to load beam 30. Connected to load beam 30 is a gimbal 34, which flexibly supports slider 100. In the illustrated embodiment, gimbal 34 extends the length of load beam 30 from proximal end 30A to distal end 30B. Gimbal 34 extends short of the end of lift tab 33.

A dimple 36, positioned at the center of slider 100, applies a load force between load beam 30 and the upper surface of slider 100 and defines a laterally extending pivot axis about which slider 100 can pitch, and a longitudinally extending pivot axis about which slider 100 can roll. Best seen in FIG. 3B, rails 32 extend distal of dimple 36.

Figure 3A:
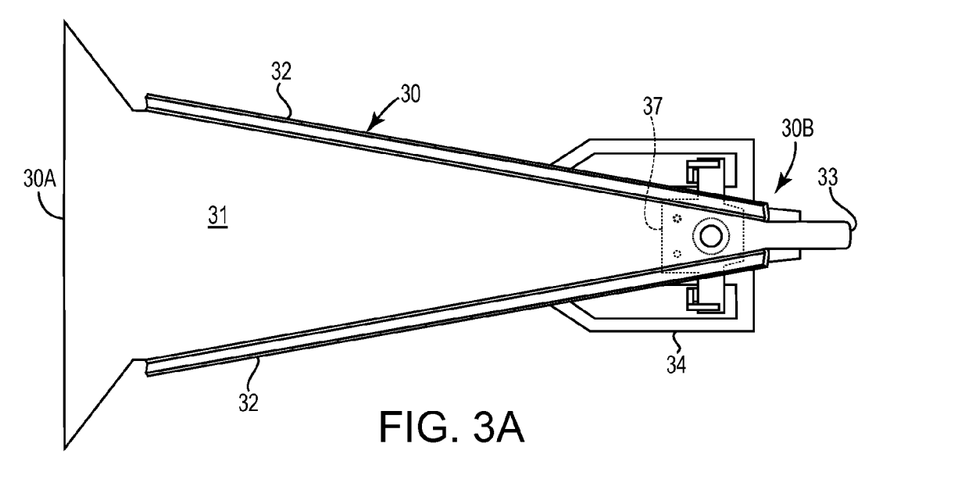
Figure 3B:
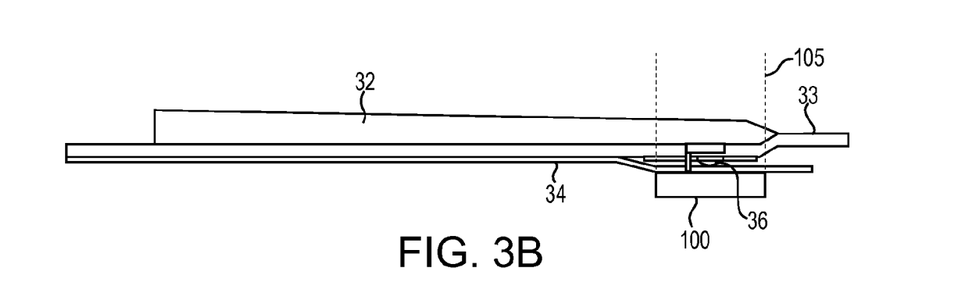

Fixed to load beam 30, between load beam 30 and gimbal 34, is at least one tab member 35, in this embodiment two tab members, a first tab member 35A and a second tab member 35B, which extend laterally out from load beam 30 in opposite directions. A portion of gimbal 34 is folded to engage tab members 35A, 35B, which are sufficiently long to extend past rails 32 and engage with gimbal 34, to form gimbal limiter 38 laterally outside of rails 32 and laterally outside of a footprint 105 of slider 100. In this embodiment, gimbal limiter 38 is composed of two structures, one formed by each tab member 35A, 35B, and is longitudinally aligned with dimple 36.

Figure 3C:
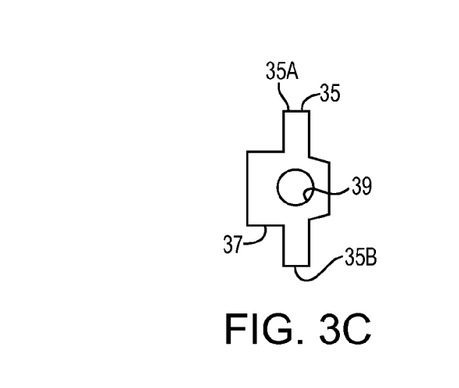
FIG. 3C is a top plan view of a load beam attachment component.
Figure 3D:
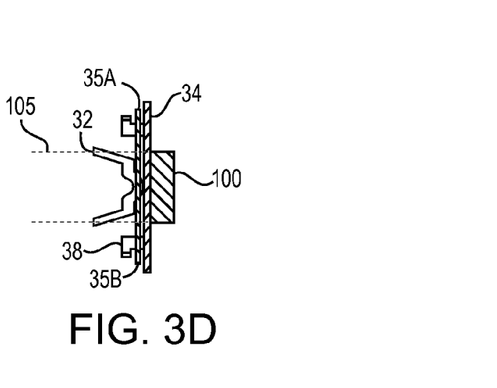
FIG. 3D is a cross-sectional end view of a disk drive suspension design with a lift tab having a gimbal limiter positioned longitudinally even with the dimple.

In this embodiment, best seen in FIG. 3C, tab members 35A, 35B are present on a component 37 that is not integral with, but prior to being fixed to load beam 30, is a separate and discrete component. Depending on the specific design and manufacturing process of load beam 30 and gimbal 34, having a discrete component 37 may be preferred over having the component formed integral with gimbal 34 or load beam 30. A discrete component may be attached to load beam 30 and/or gimbal 34 by, e.g., soldering, welding, or adhesive. In the illustrated embodiment, component 37 includes an aperture 39 that allows dimple 36 to pass therethrough.

FIGS. 4A, 4B, 4C and 4D illustrate an embodiment similar to that of FIGS. 3A, 3B, 3C, 3D, where two tab members extend out laterally from the load beam to form a gimbal limiter that is longitudinally aligned with the dimple. Similar to the suspension of FIGS. 3A, 3B and 3D, the suspension design of FIGS. 4A, 4B and 4D has a load beam 40 with a proximal end 40A and a distal end 40B with a lift tab 43 at distal end 40B. Load beam 40 has an elongate central planar surface 41 bounded by continuous rails 42 to provide sufficient stiffness to load beam 40. Connected to load beam 40 is a gimbal 44, which extends the length of load beam 40 from proximal end 40A to distal end 40B yet extends short of the end of lift tab 43.

A dimple 46, positioned at the center of slider 100, applies a load force between load beam 40 and the upper surface of slider 100 and defines a laterally extending pivot axis about which slider 100 can pitch, and a longitudinally extending pivot axis about which slider 100 can roll. Best seen in FIG. 4B, rails 42 extend distal of dimple 46.

Figure 4A:
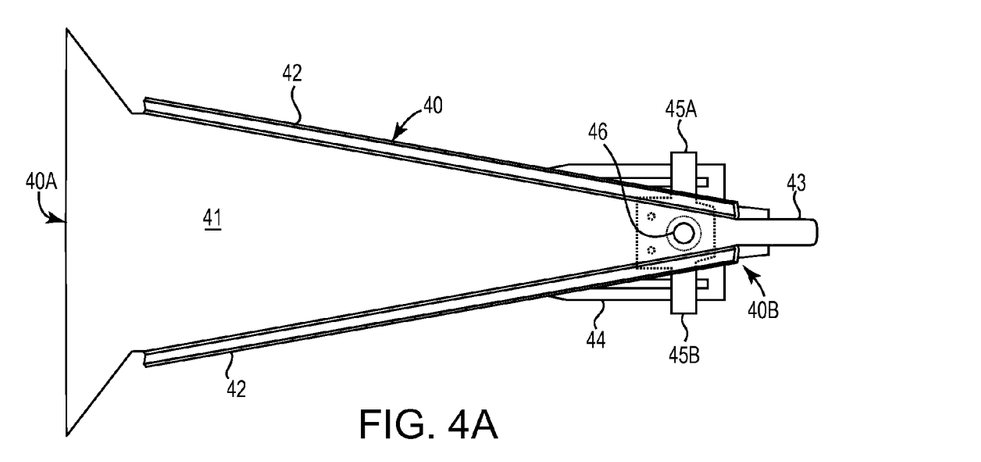
Figure 4B:
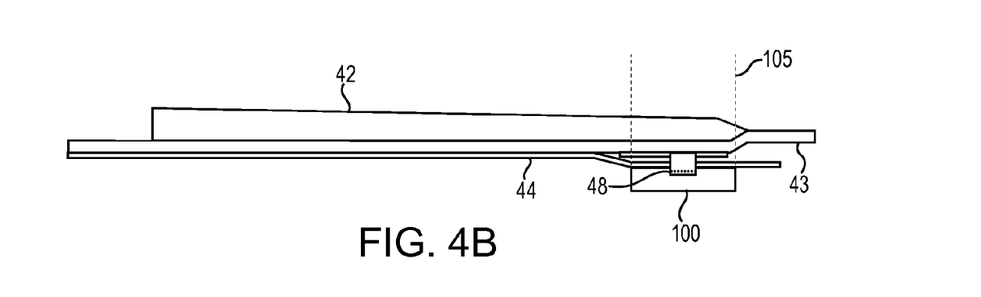

Fixed to load beam 40, between load beam 40 and gimbal 44, is at least one tab member 45, in this embodiment two tab members, a first tab member 45A and a second tab member 45B, which extend laterally out from load beam 40 in opposite directions past rails 42. In this embodiment, a portion of tab members 45A, 45B is folded to engage gimbal 44 to form gimbal limiter 48 laterally outside of rails 42 and laterally outside of footprint 105 of slider 100. In this embodiment, gimbal limiter 48 is composed of two structures, one formed by each tab member 45A, 45B, and is longitudinally aligned with dimple 46.

Figure 4C:
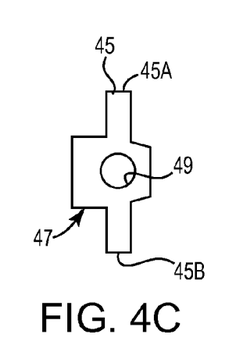
FIG. 4C is a top plan view of a load beam attachment component.
Figure 4D:
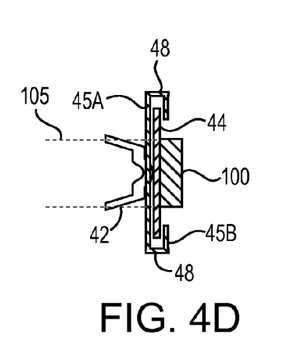
FIG. 4D is a cross-sectional end view of another embodiment of a disk drive head suspension design with a lift tab having a gimbal limiter positioned longitudinally even with the dimple.

Similar to the previous embodiment, best seen in FIG. 4C, tab members 45A, 45B are present on a separate and discrete component 47. Depending on the specific design and manufacturing process of load beam 40 and gimbal 44, having a discrete component 47 may be preferred over having the component formed integral with gimbal 44 or load beam 40. Similar to the previous embodiment, component 47 includes an aperture 49 that allows dimple 46 to pass therethrough.

FIGS. 5A, 5B and 5C, 6A, 6B and 6C, and 7A, 7B and 7C illustrate embodiments where one tab member extends distally from the load beam distal to the dimple. In some embodiments, a portion of the gimbal is folded to engage the tab member and in other embodiments a portion of the tab member is folded to engage the gimbal. In all of these embodiments, the resulting gimbal limiter is positioned at the trailing edge side of the gimbal.

Figure 5A:
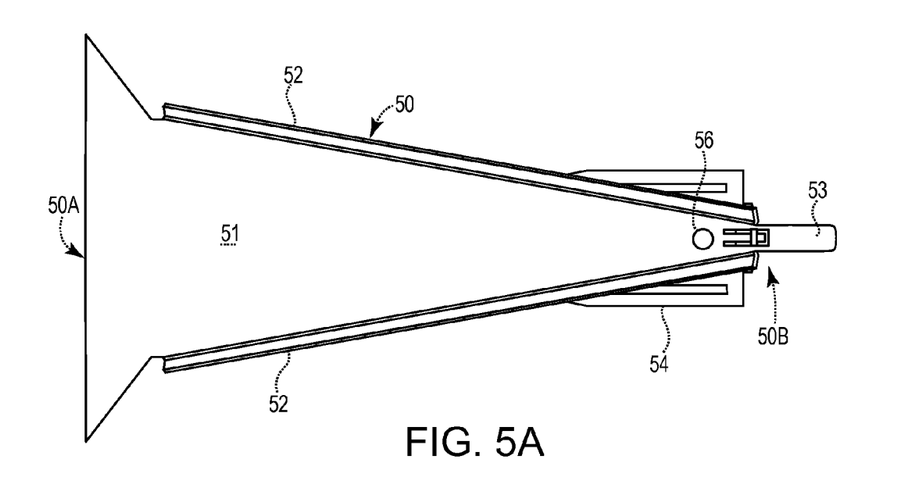
Figure 5B:
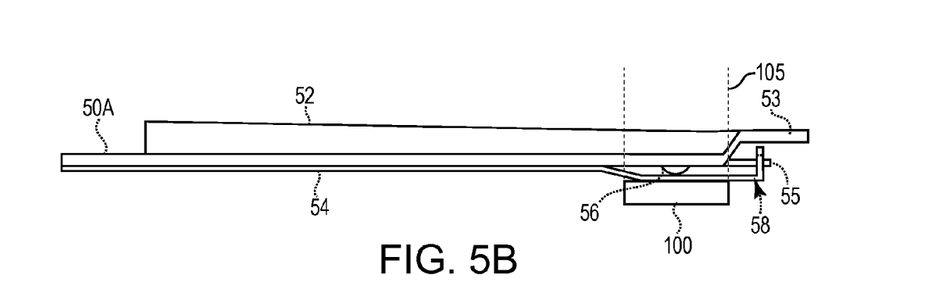
Figure 5C:
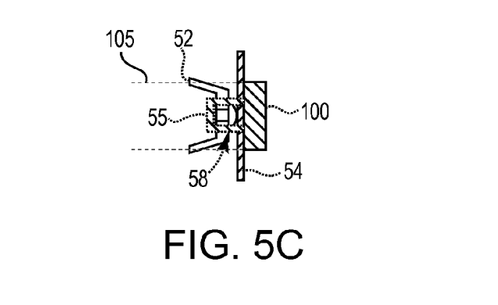
FIG. 5C is a cross-sectional end view of a disk drive suspension design with a lift tab having a gimbal limiter positioned distal to the dimple.

Referring to FIGS. 5A, 5B and 5C, the suspension design has a load beam 50 with a proximal end 50A and a distal end 50B with a lift tab 53 at distal end 50B. Load beam 50 has an elongate central planar surface 51 bounded by continuous rails 52 that extend from the proximal end 50A to distal end 50B and to lift tab 53 in order to provide sufficient stiffness to load beam 50. Connected to load beam 50 is a gimbal 54, which flexibly supports slider 100. In the illustrated embodiment, gimbal 54 extends the length of load beam 50 from proximal end 50A to distal end 50B yet extends short of the end of lift tab 53.

A dimple 56, positioned at the center of slider 100, defines a laterally extending pivot axis about which slider 100 can pitch, and a longitudinally extending pivot axis about which slider 100 can roll. Best seen in FIG. 5B, rails 52 extend distal of dimple 56.

Fixed to load beam 50 at distal end 50B is at least one tab member 55, which extends longitudinally, centrally and distally out from load beam 50. Tab member 55 is positioned between lift tab 53 and gimbal 54. A portion of gimbal 54, in this embodiment the distal-most portion of gimbal 54, is folded to engage tab member 55 to form gimbal limiter 58 on the trailing edge side of slider 100, and in this illustrated embodiment, distal to the trailing edge of slider 100 and distal to (i.e., outside of) footprint 105 of slider 100.

Figure 6A:
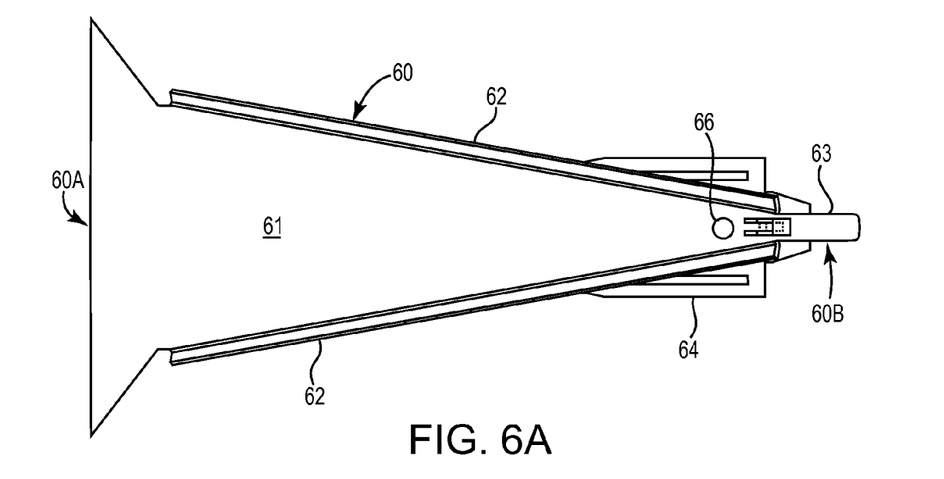
Figure 6B:
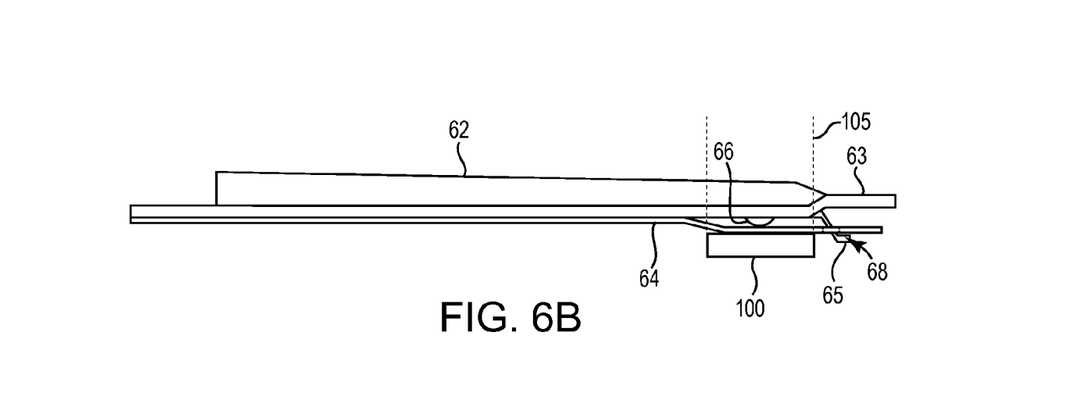
Figure 6C:
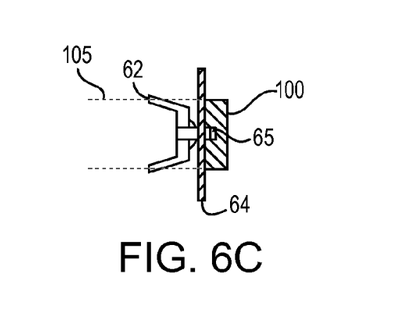
FIG. 6C is a cross-sectional end view of another embodiment of a disk drive suspension design with a lift tab having a gimbal limiter positioned distal to the dimple.

FIGS. 6A, 6B and 6C illustrate another embodiment having a tab member extending distally from the load beam and distal of the dimple, the tab member forming a gimbal limiter. The suspension design of FIGS. 6A, 6B and 6C has a load beam 60 with a proximal end 60A and a distal end 60B with a lift tab 63 at distal end 60B. Load beam 60 has an elongate central planar surface 61 bounded by continuous rails 62 that extend from the proximal end 60A to distal end 60B and to lift tab 63 in order to provide sufficient stiffness to load beam 60. Connected to load beam 60 is a gimbal 64, which flexibly supports slider 100.

A dimple 66, positioned at the center of slider 100, defines a laterally extending pivot axis about which slider 100 can pitch, and a longitudinally extending pivot axis about which slider 100 can roll. Best seen in FIG. 6B, rails 62 extend distal of dimple 66.

Fixed to load beam 60 at distal end 60B is at least one tab member 65, which extends longitudinally and centrally out from load beam 60. Tab member 65 is positioned between lift tab 63 and gimbal 64. A portion of tab member 65 is folded to engage gimbal 64 to form gimbal limiter 68 on the trailing edge side of slider 100, and in particular, distal to the trailing edge of slider 100 and distal to footprint 105 formed by slider 100. In this embodiment, tab member 65 is folded less than 90 degrees, e.g., about 60 degrees, to engage gimbal 64.

Figure 7A:
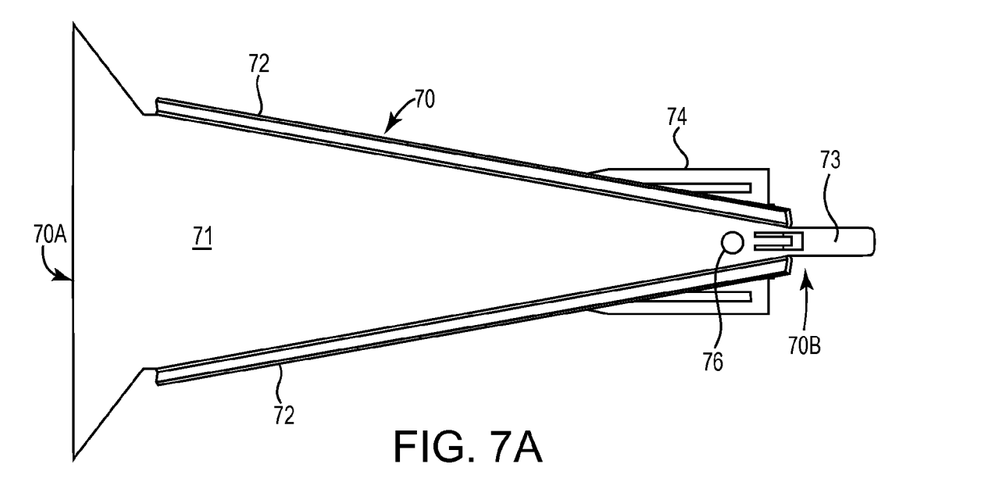
Figure 7B:
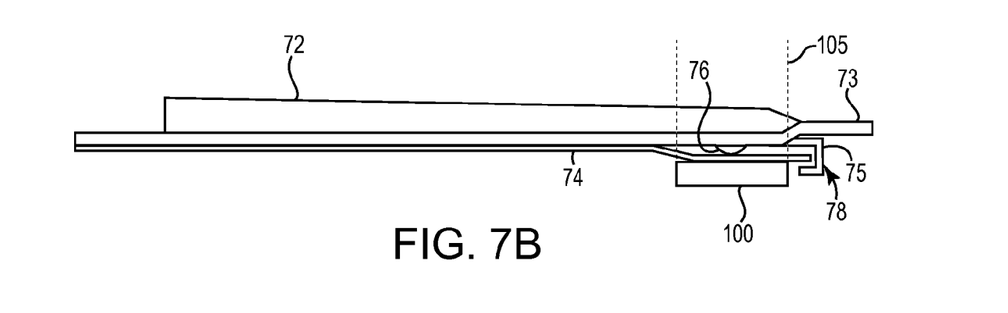
Figure 7C:
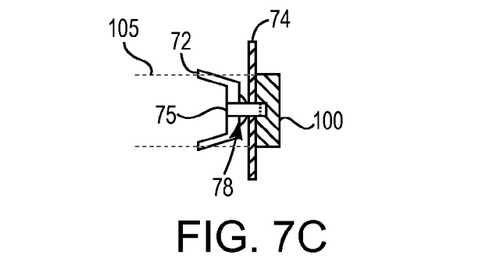
FIG. 7C is a cross-sectional end view of yet another embodiment of a disk drive suspension design with a lift tab having a gimbal limiter positioned distal to the dimple.

FIGS. 7A, 7B and 7C illustrate an embodiment similar to that of FIGS. 6A, 6B and 6C where a tab member extending distally from the load beam and distal of the dimple is bent to form a gimbal limiter. Similar to the suspension of FIGS. 6A, 6B and 6C, the suspension design of FIGS. 7A, 7B and 7C has a load beam 70 with a proximal end 70A and a distal end 70B with a lift tab 73 at distal end 70B. Load beam 70 has an elongate central planar surface 71 bounded by continuous rails 72 that extend from the proximal end 70A to distal end 70B and to lift tab 73 in order to provide sufficient stiffness to load beam 70. Connected to load beam 70 is a gimbal 74, which flexibly supports slider 100.

A dimple 76, positioned at the center of slider 100, defines a laterally extending pivot axis about which slider 100 can pitch, and a longitudinally extending pivot axis about which slider 100 can roll. Best seen in FIG. 7B, rails 72 extend distal of dimple 76.

Fixed to load beam 70 at distal end 70B is at least one tab member 75, which extends longitudinally and centrally out from load beam 70. Tab member 75 is positioned between lift tab 73 and gimbal 74. A portion of tab member 75 is folded down and back to engage gimbal 74 to form gimbal limiter 78 on the trailing edge side of slider 100 and in particular, distal to the trailing edge of slider 100 and distal to footprint 105 formed by slider 100. In this embodiment, tab member 75 is folded about 90 degrees twice, to form a return to gimbal 74.

Various embodiments of disk drive suspensions comprising a load beam with a lift tab and stiffening rails and having gimbal limiters located at the dimple or trailing edge side of the dimple have been described. In general, each of these embodiments has at least one tab member, extending either longitudinally or laterally from the load beam at or distal to the dimple, the tab member forming a gimbal limiter. In most embodiments, the gimbal limiter is symmetric along the longitudinal axis of the suspension. The illustrated embodiments can be separated into two general categories. The first has the tab member(s) extending laterally from the load beam directly at or distal to the dimple. The tab member(s) may be integrally formed on, in, or with the load beam or be present on a component separate from the load beam, the component being secured to the load beam in some manner (e.g., soldering, welding, or adhesive). As indicated above, however, in most embodiments the gimbal limiter is symmetric along the longitudinal axis, so that the same number of tab member(s) is present on each side of the load beam and in the same location. The second category has a tab member extending longitudinally from the load beam (in most embodiments, a centrally located tab member extending from the load beam), the tab member being distal to the dimple, and in some embodiments distal to the trailing edge of the slider. The longitudinal tab member may be integrally formed on, in, or with the load beam or be present on a component separate from the load beam. Both of the categories of tab members allow the gimbal limiter to be positioned in the desired location, which is at the dimple or on the trailing edge half of the slider without interrupting the continuous rails on the load beam.

Specifically, FIGS. 3A, 3B, 3C and 3D and FIGS. 4A, 4B, 4C and 4D are particular examples that utilize an additional component for the tab members to enable a limiter at the dimple location. The embodiment of FIGS. 3A, 3B, 3C and 3D has an additional component that is flat and a gimbal feature (e.g., upwardly extending posts or ears) that engages the tab members on this flat component. Alternatively, the embodiment of FIGS. 4A, 4B, 4C and 4D has an additional component with a formed tab feature (e.g., downwardly bent returns) that engage the gimbal with no additional feature required on the gimbal. The additional component may be any suitable material, e.g., plastic, metal, etc., although in some embodiments the same material is used for the component as for the load beam (e.g., stainless steel).

FIGS. 5A, 5B and 5C, FIGS. 6A, 6B and 6C, and FIGS. 7A, 7B and 7C are particular examples that utilize a center tab feature extending longitudinally from center of the load beam. All three of these embodiments have a gimbal limiter that engages the gimbal at the trailing edge side of the gimbal. The embodiment of FIGS. 5A, 5B and 5C maintains a flat center tab feature on the load beam, extending from the planar center portion of the load beam. For this embodiment, the gimbal has a feature that is formed upward (e.g., bent) to engage this flat center tab. The embodiment of FIGS. 6A, 6B and 6C has the center tab formed downward (e.g., bent) from the load beam center portion and is interleaved with an aperture in the gimbal. The embodiment of FIGS. 7A, 7B and 7C has a center tab that is formed (e.g., bent) around the gimbal to form a return.

As indicated above, 'thin' load beams, those with thicknesses of about 0.05 mm or less (e.g., 0.025-0.05 mm) utilize continuous rails along their lengths to provide sufficient torsional stability and stiffness to the load beam. In some embodiments load beams thicker than 0.05 mm may include side rails. In order to provide sufficient stiffness, the rails extend at least to the dimple, and in most embodiments, extend distal of the dimple. Preferably, the rails are continuous, void of any breaks along their length. As one particular example, a stainless steel load beam, about 0.03 mm thick, has side rails that extend about 0.25 mm above the planar surface of the load beam.

In most embodiments, the gimbal limiter, no matter which embodiment described or illustrated herein, allows no more than 0.1 mm travel of the gimbal and slider from the dimple, in some embodiments no more than 0.08 mm. The distance of travel allowed is usually at least 0.05 mm, which is generally sufficient to accommodate the pitching and rolling of the slider.

It is understood that numerous variations of gimbal limiters could be made while maintaining the overall inventive designs of this disclosure and remaining within the scope of the invention. Thus, various embodiments of the GIMBAL LIMITER FOR SUSPENSION WITH LIFT TAB are disclosed. The implementations described above and other implementations are within the scope of the following claims. One skilled in the art will appreciate that the present invention can be practiced with embodiments other than those disclosed. The disclosed embodiments are presented for purposes of illustration and not limitation, and the present invention is limited only by the claims that follow.

What is claimed is:

1. A head suspension for a disk drive comprising:
   load beam having a proximal end and a distal end and comprising a distal lift tab, the load beam supporting a gimbal including a portion for supporting a slider;
   a dimple positioned proximal to the lift tab, the dimple being operatively positioned on one of the load beam and the gimbal for providing a pitch axis and a roll axis for the slider;
   continuous rails on the load beam extending along the load beam toward the distal end, the rails extending to at least the dimple;
   an attachment component including a first portion and a pair of tab members that extend from the first portion, the first portion of the attachment component being fixed to a surface of the load beam facing the gimbal so that the pair of tab members also extend laterally from the load beam, the tab members aligned with or distal to the dimple; and
   a gimbal limiter formed by engagement of the tab members and the gimbal, the gimbal limiter aligned with or distal to the dimple.

2. The suspension of claim 1 wherein the tab members are bent to engage the gimbal.

3. The suspension of claim 1 wherein the gimbal is bent to engage the tab members.

4. The suspension of claim 1, wherein the attachment component is fixedly attached to the gimbal.

5. The suspension of claim 1, wherein the attachment component is fixedly attached to the load beam.

6. The suspension of claim 5 wherein the attachment component is welded to the load beam.

7. The suspension of claim 1 wherein the load beam is less than 0.05 mm thick.

8. A head suspension for a disk drive comprising:
   load beam having a proximal end and a distal end and comprising a distal lift tab, the load beam supporting a gimbal including a portion for supporting a slider;
   a dimple positioned proximal to the lift tab, the dimple providing a pitch axis and a roll axis for the slider;
   continuous rails on the load beam extending along the load beam toward the distal end, the rails extending to at least the dimple;
   an attachment component including a first portion with an aperture and a plurality of tab members that extend from the first portion, the first portion of the attachment component being fixed to a surface of the load beam facing the gimbal with the dimple positioned within the aperture so that plural tab members also extend laterally in relation to the load beam, the tab members aligned with or distal to the dimple; and
   a gimbal limiter formed by engagement of the tab members and the gimbal, the gimbal limiter aligned with or distal to the dimple.

9. The suspension of claim 8 wherein the two tab members extend symmetrically about a longitudinal axis of the load beam.

10. The suspension of claim 8 wherein the attachment component is fixedly attached to the gimbal.

11. The suspension of claim 8 wherein the attachment component is fixedly attached to the load beam.

12. The suspension of claim 11 wherein the attachment component is welded to the load beam.

13. The suspension of claim 8 wherein the tab members are bent to engage the gimbal.

14. The suspension of claim 8 wherein the gimbal is bent to engage the tab members.

* * * * *